June 10, 1941.  E. F. MARTINET  2,245,151
TUBULAR COUPLING FOR SUCTION CLEANERS AND THE LIKE
Filed June 8, 1939.  2 Sheets-Sheet 1
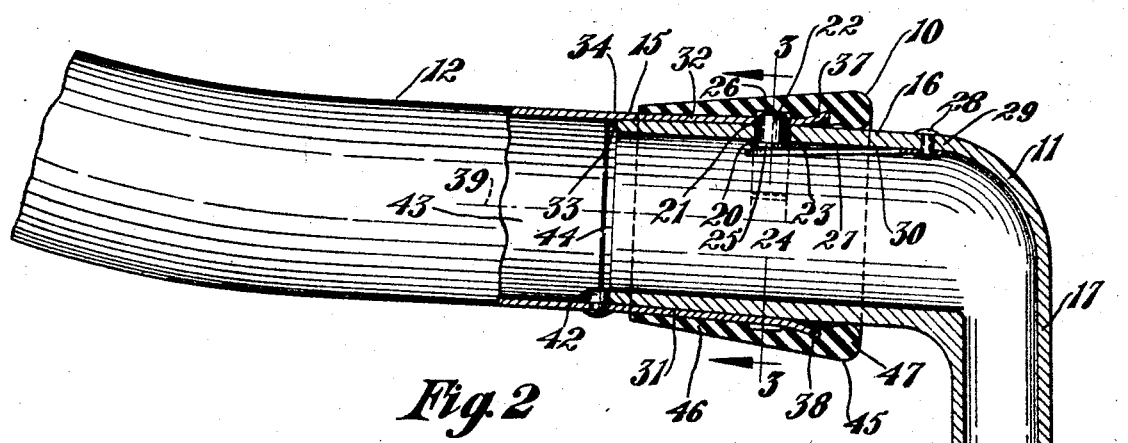
Fig. 2
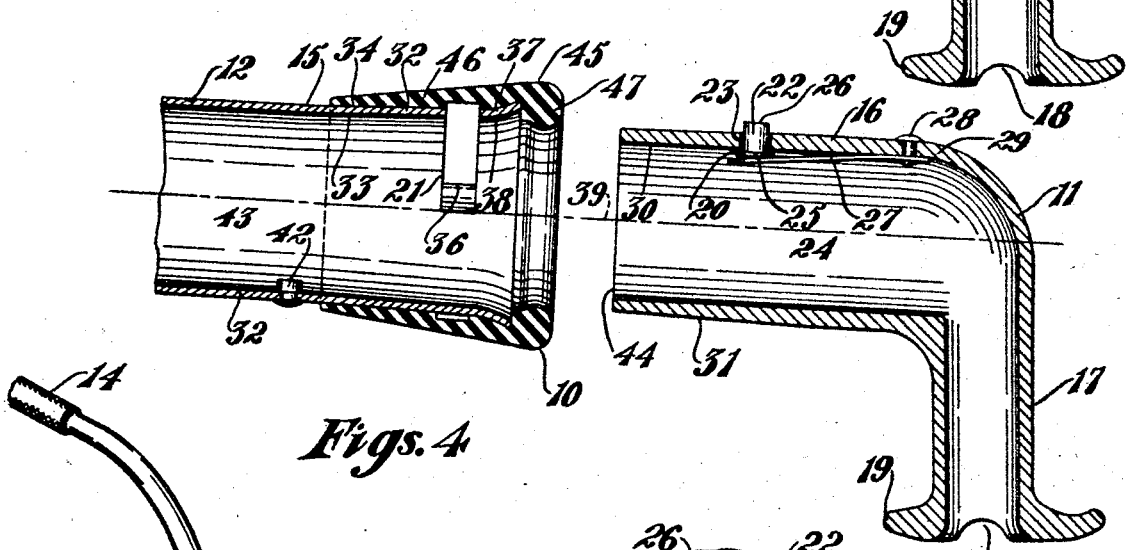
Figs. 4
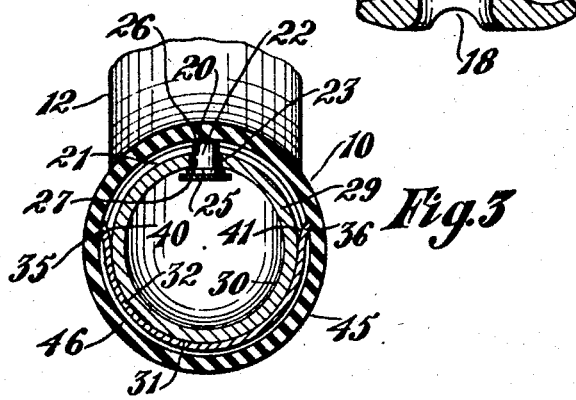
Fig. 3
Fig. 1
Inventor
Eugene F. Martinet
By Frease and Bishop
Attorneys June 10, 1941.  E. F. MARTINET  2,245,151
TUBULAR COUPLING FOR SUCTION CLEANERS AND THE LIKE
Filed June 8, 1939  2 Sheets-Sheet 2
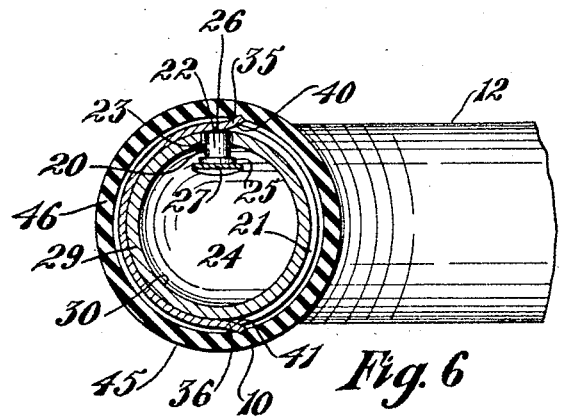
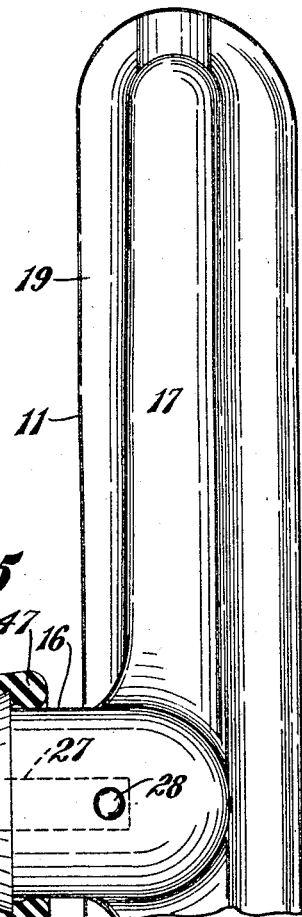
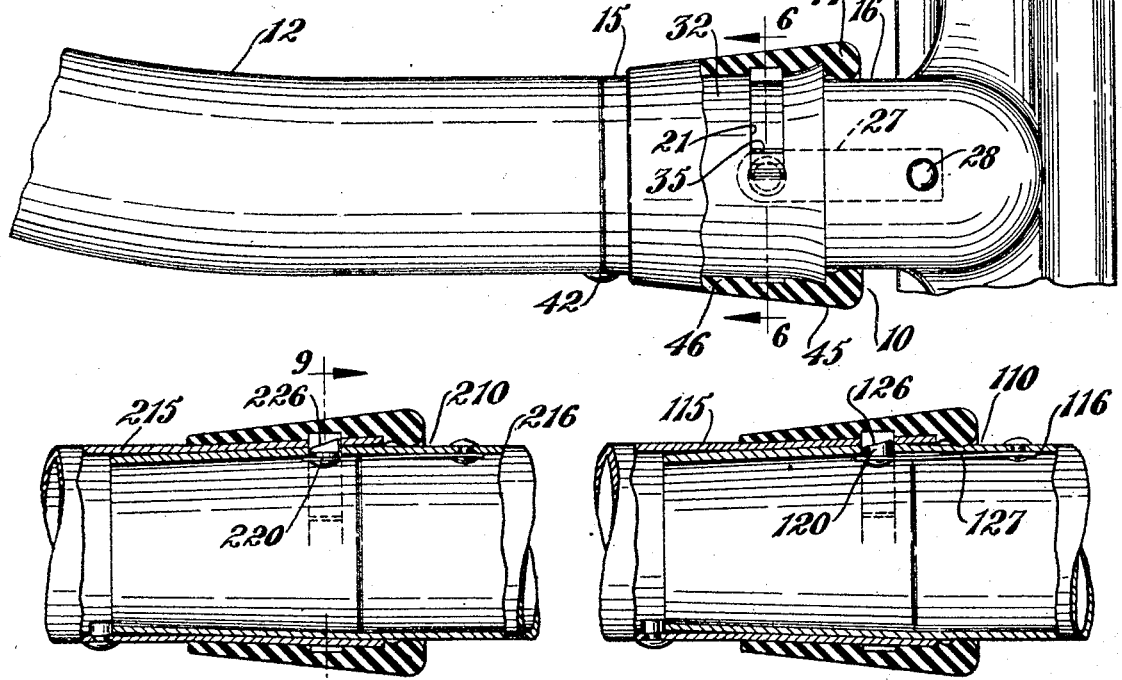
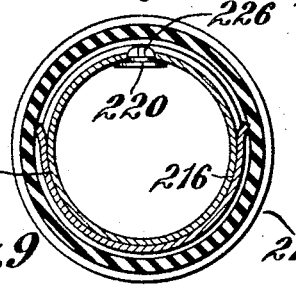
Inventor
Eugene F. Martinet
By Frease and Bishop
Attorneys Patented June 10, 1941

2,245,151

UNITED STATES PATENT OFFICE 2,245,151

TUBULAR COUPLING FOR SUCTION CLEANERS AND THE LIKE

Eugene F. Martinet, Cleveland, Ohio, assignor to The P. A. Geier Company, Cleveland, Ohio, a corporation of Ohio Application June 8, 1939, Serial No. 278,107

3 Claims. (Cl. 285—174)

My invention relates to tubular couplings more particularly adapted for use in suction cleaners where separable air-tight connections, which in some cases are swivel air-tight connections, are desired between attachment hose, tubes, nozzles, and the like.

Telescoping couplings are frequently used in suction cleaners including two tubular members one of which telescopes within the other. The telescoping members may be straight tubular members with a stop to limit the length of the telescoping portions, or the inner tubular member may have an external taper for tightly fitting within the outer tubular member which is provided with an internal taper for frictionally fitting with the external taper on the inner tubular member.

In other cases, some form of mechanical connecting means may be provided for effecting a positive mechanical connection between the usually telescoping tubular members.

In the case of swivel joints, separable swivel joints prior to my improvements, usually each includes two swivelling parts inseparably associated with each other, one of which is separably associated with a tube or the like, so that dust accumulates between the inseparable parts of such a swivel joint.

In my copending applications for U. S. Letters Patent, Serial No. 131,857, and Serial No. 258,373, of which Serial No. 131,857 matured in Patent No. 2,184,881 I show various forms of improved air sealed tubular couplings which may have mechanical connecting means between two tubular members, or which may have either straight or tapered slip joints between two tubular members, and in each case the jointure between the tubular members is augmented and sealed by the use of an improved resilient air-tight closure sleeve, preferably a rubber closure sleeve located on one of the tubular members in air-tight engagement therewith, the rubber sleeve extending from the one tubular member beyond the end thereof in separable or removable air-tight engagement with the other tubular member when the tubular members are in connected position.

The tubular coupling of my Patent No. 2,184,881 may be a swivel coupling, but its mechanical connecting means requires manual actuation for connecting or disconnecting the tubular members together.

The objects of the present improvements include in general, preferably in an air sealed coupling such as set forth in my said prior applications, a mechanically connected tubular coupling in which the connection and disconnection of the tubular members is effected solely by relative movements of the couplings with respect to each other, and requiring no separate manipulation of a release means for the mechanical connecting means, thereby very greatly facilitating the use of the coupling.

Further objects of the present improvements include the provision of such a coupling particularly adapted for use as a swivel coupling, and in which the swivel parts are separable so that dust does not accumulate between the swivel parts.

Further objects of the improvements include the provision of such an improved tubular coupling preferably including tapered telescoping tubular members which may be when desired connected with usual non-swivelling tapered tubular members of frictionally engaged tapered tubular couplings or joints.

Further objects of the improvements include the provision of an improved tubular coupling with automatically actuating means for connecting and disconnecting the two tubular members thereof, and which may be made by additions to and modifications of the usual telescoping tapered portions of a usual tapered tubular coupling or joint, thus enabling the improved joint to be made in its initial stages by the use of the same dies used to make the usual tapered joint.

The foregoing and other objects are attained by the tubular couplings, parts, combinations, and sub-combinations which comprise the present invention, and the nature of which is set forth in the following general statement, and preferred embodiments of which are set forth in the following description, and which are particularly and distinctly pointed out and set forth in the appended claims forming part hereof.

The nature of the improved tubular coupling of the present invention may be stated in general terms as comprising an automatic detent connectable and disconnectable separable tubular coupling including two tubular members arranged for separable telescoping jointure with each other, a spring pressed detent member operatively mounted on one of the tubular members, the other tubular member having formed therein a recess adapted to receive the detent member, the members having a plurality of sloping surfaces for successively impinging with each other for successively displacing the detent member during successive movements of the telescoping tubular members with respect to each other, and by which when the coupling is being assembled, straight longitudinal telescoping movement of the inner tubular member into the outer tubular member serves automatically to displace the detent from its protruding position until the detent registers with and springs into the recess connecting the tubular members.

In separating the assembled coupling, the telescoped tubular members are twisted about their longitudinal axes and the detent is displaced from its connecting projection into the recess, thereby permitting the telescoped tubular members to be pulled apart.

Preferably my improved resilient preferably rubber closure sleeve is located on one of the tubular members in air-tight engagement therewith, the rubber sleeve extending from the one tubular member beyond the end thereof in separable or removable air-tight engagement with the other tubular member when the tubular members are in connected position.

By way of example, embodiments of the improved tubular coupling hereof, are illustrated in the accompanying drawings forming part hereof, in which—

Figure 1 is a fragmentary perspective view illustrating a suction cleaner nozzle and a plurality of suction tubes connected with each other and with the nozzle by a plurality of my improved tubular couplings hereof;

Fig. 2, an enlarged elevation view of the nozzle of Fig. 1 and the curved suction tube to which it is connected by one embodiment of my improved tubular couplings hereof, portions of the tubular coupling being broken away and shown in vertical section on the longitudinal axis of the improved tubular coupling;

Fig. 3, a transverse sectional view thereof as on line 3—3, Fig. 2;

Fig. 4, views of the suction tube and associated coupling parts of Fig. 2 separated from the nozzle and its associated coupling parts;

Fig. 5, a top plan view of the parts shown in Fig. 2, after the curved suction tube has been twisted to displace the spring pressed detent from the recess so that the tubular members of the coupling may be longitudinally separated;

Fig. 6, a transverse sectional view thereof as on line 6—6, Fig. 5;

Fig. 7, a fragmentary elevation view with portions broken away and illustrated in longitudinal axial section showing a second embodiment of my improved coupling hereof;

Fig. 8, a view similar to Fig. 7 showing a third embodiment of my improved tubular coupling hereof; and Fig. 9, a transverse sectional view thereof as on line 9—9, Fig. 8.

Similar numerals refer to similar parts throughout the drawings.

In Figs. 1 to 6 inclusive there is illustrated one embodiment indicated generally by 10 of the improved tubular coupling hereof, which may be termed an automatic detent connectable and disconnectable air sealed separable tubular coupling, and which is a swivel coupling which connects a suction cleaner nozzle 11 with one end of a curved tube section 12, the other end of which may be connected by another coupling 10 with one end of another curved tube section 13, the other end of which in turn may be connected with one end of a flexible tube 14 which may be the flexible suction intake tube of a tank or stationary type suction cleaner, not shown.

The improved tubular coupling 10 includes an outer telescoping tubular member or tube 15, which as shown is an integral end portion of the suction tube 12, and an inner telescoping tubular member or tube 16 which as shown is an integral part of the nozzle 11 constituting the discharge tube thereof.

The nozzle 11 furthermore includes a mouth 17, the upper end of which connects with the inner end of the tube 16 and the lower end of which outwardly flares and terminates in the suction entrance 18 having an engirdling lip 19 arranged to be moved across the surface to be cleaned in the usual manner.

A spring pressed detent or detent member indicated generally by 20 is operatively mounted on one of the tubular members, which as shown is the inner tubular member 16.

The other tubular member, as shown, the outer tubular member 15, has formed therein a recess indicated generally by 21 for receiving the spring pressed detent or detent member 20 protruding from the inner tubular member 16 when the coupling is assembled as best shown in Fig. 2.

In the coupling 10, as shown, the spring pressed detent or detent member 20 includes a cylindric shank 22 extending through a cylindric aperture 23 formed in one side of the tube 16, the inner end of the cylindric shank 22 within the tubular passageway 24 of the tube 16 having an enlarged head 25 formed thereon, and the other outer end of the shank 22 having a flat circumferential end face or surface 26 at right angles to the longitudinal axis of the cylindric shank 22.

Spring pressure for the spring pressed detent 20, as shown, is supplied by a flat spring 27 located within the tubular passageway 24 of the tube 16 and having one end abutting against the enlarged head 25 of the detent 20 and its other end secured as by a rivet 28 to the tubular wall 29 of the tube 16.

The inner tube 16 includes the tubular wall 29 having as shown an internal cylindric tubular surface 30 and an external tapered conical tubular surface 31; and the outer tube 15 includes a tubular wall 32 which as shown has an internal tapered or conical tubular surface 33 and an external tapered or conical tubular surface 34.

As best shown in Figs. 3 and 4, the recess 21 is formed in the tubular wall 32 of the outer tube 15; and in the coupling 10, the recess 21 is in the form of a recessed slot cut through the tube wall 32 and extending circumferentially around a substantial portion of the tube wall 32 and terminating at opposite circumferentially spaced ends formed by angled tongue portions 35 and 36 of the tube wall 32.

For the purposes of the present improvements, when the detent member 20 has a flat end face 26, the tubular member 15 terminates in an outwardly flaring end portion 37, by which the inner tubular surface 33 of the tubular member 15 is formed with an entrance portion 38 which is longitudinally tapered or sloping with respect to the tubular axis 39 of the tube 15.

The tongues 35 and 36 have opposite circumferentially tapered or sloping inner surfaces 40 and 41 respectively as best shown in Fig. 3.

The several sloping surfaces 38, 40, and 41 of the internal tubular surface 33 of the tubular member 15 and the flat end surface 26 of the detent member 20 may be termed a plurality of differently sloping surfaces of the members, since the slope of each is different than the slope of the other, regardless of the plane of reference.

By this arrangement of the several differently sloping surfaces of the tubular member 15 and the detent member 20, the automatic actuation of the detent member 20 for detent connecting and disconnecting the tubular members 15 and 16 with each other is effected by successively impinging the differently sloping surfaces of the tubular member and the detent member with each other for successively displacing the detent member during successive movements of the telescoping tubular members with respect to each other.

When the tubular members 15 and 16 are separated as shown in Fig. 4, longitudinal telescoping movement of the inner tubular member 16 into the outer tubular member 15 serves first to impinge the flat surface 26 of the detent member 20 against the longitudinally tapered or sloping surface portion 38, displacing the spring pressed detent member 20 in sliding abutment with the internal tubular surface of the tube 15 until the length of the telescopic overlap of the telescopically assembled tubular members 15 and 16 is such that the spring pressed detent member 20 registers with and protudes into the recess or slot 21, at which time the tubular members 15 and 16 are automatically mechanically connected.

For automatically releasing the mechanical connection between the tubular members 15 and 16, the assembled telescoped tubular members 15 and 16 are twisted with respect to each other in a selected direction about their tubular axes which as shown are common, until the coupling parts have assumed positions such as shown in Figs. 5 and 6, during which selected twisting movement the sloping surface 40 of the tongue 35 has impinged against the differently sloping end surface 26 of the detent member 20 displacing the same inwardly out of engagement with the recess or slot 21, so that the tubular members 15 and 16 may be freely pulled away from each other and separated, as shown in Fig. 4.

Similar displacement of the detent member 20 occurs when the tubes 15 and 16 are twisted in the opposite direction and the detent member is impinged by the tongue 36. Thus, the automatic release of the mechanical connection between the tubular members 15 and 16 is effected, regardless of the direction of twist.

The recess 21 as shown is in the form of a slot cut entirely through the wall 32 of the tube 15, but obviously the recess 21 might be pressed or molded into the tube wall 32 without cutting through the tube wall 32.

By making the recess 21 of substantial circumferential length in the coupling 10, swivelling of the tubular members 15 and 16 is provided for.

Preferably stop means are provided between the tubular members 15 and 16 to limit the length of the telescopic overlap of the assembled tubular members, and as illustrated the stop means includes a stop pin 42 having one end riveted to the tube wall 32 of the tube 15 and extending into the tubular opening 43 of the tube 15 for abutment by the outer end face 44 of the tube 16 when the tubes are in assembled position as shown in Fig. 2.

The taper of the internal tubular surface 33 of the outer tube 15 and the outer tubular surface 31 of the inner tube 16 match each other, and are preferably the same as usual frictional taper joints or couplings, whereby the dies used for making such usual frictional taper joints or couplings may be utilized in the initial stages of the manufacture of the improved coupling 10.

From the standpoint of a swivel joint, the internal tubular surface 32 of the tube 15 and the external tapered surface 31 of the tube 16 are surfaces of revolution in the usual frictional taper joint and preferably in the present improvements, permitting by suitable location of the stop pin 42 of a relative close swivelling fit between the assembled telescoped tubes 15 and 16, with considerably less play than if the telescoping surfaces were cylindric.

The separability of the swivelling tubes 15 and 16 permits the swivelling surfaces thereof to be rubbed with a cloth so as to prevent the accumulation of dust.

Means for air sealing the connected tubular members or tubes 15 and 16 are provided, which as shown are in the form of an improved resilient preferably rubber closure sleeve 45 including a body portion 46 making a circumferential closure on the outer tubular member 15 and having an enlarged resilient gripping ring portion 47 making a gripping closure engagement with the entire circumference of the inner tubular member 16.

The second embodiment of the improved tubular coupling indicated generally by 110 in Fig. 7 is generally similar to the coupling 10, with the exception that the outer tube 115 of the coupling 110 is not provided with an outwardly flaring end portion such as 37 or a longitudinally tapered or sloping entrance portion of the inner tubular surface of the tubular member 115. In the coupling 110 the function of the longitudinally tapered entrance portion of the inner tubular surface of the outer tube 15 in the coupling 10, is attained by providing a sloping end face 126 on the detent or detent member 120 thereof, the slope of the end face or surface 126 being a longitudinal slope or taper with respect to the longitudinal axis of the tubular members 115 and 116. The detent member 120 is rivet connected to its spring 127.

The coupling 110 operates in automatically mechanically connecting and disconnecting the tubular members 115 and 116 thereof in exactly the same manner as does the coupling 10.

The third embodiment of the improved tubular coupling indicated generally by 210 in Fig. 8 is generally similar to the coupling 110 but in the coupling 210 the outer end surface 226 of the detent member 220 is sloping or tapered longitudinally and circumferentially or sidewise with respect to the tubular members 215 and 216, whereby the operation of the coupling 210 is identical with the operation of the couplings 10 and 110.

It is to be noted for example in the coupling 10, that by making the inner tapered tubular surface of the outer tube 15 have the same taper as a usual frictional taper joint, suction cleaner attachments having connector tubes with usual external tapers may be selectively frictionally connected with the tube 15.

In other words the outer tube end portion 15 of the suction tube 12 may serve either as part of one of the improved preferably swivel couplings 10, or as part of a usual frictional taper joint or coupling.

This permits adoption of the improved coupling 10 without requiring obsolescence and redesign of suction cleaner attachments having usual frictional taper joints.

The embodiments of the present improvements illustrated and described herein are by way of example, and the scope of the present invention is not limited to the same or to the particular details thereof, but is commensurate with any and all novel subject matter contained herein which may at any time properly under the United States patent laws be set forth in claims hereof or originating herein, the elements of any of such claims being intended to include their reasonable equivalents.

I claim:

1. A sealed tubular coupling for suction tubes including two tubular members arranged for separable telescoping jointure with each other to provide an air passageway from the one into the other, one of the tubular members having a spring pressed detent operatively mounted thereon, the other tubular member having a detent receiving recess slot formed in its tube wall and extending circumferentially around a substantial portion thereof for permitting substantial relative rotation between the tubular members with said detent received in said recess slot, the detent and the ends of said recess slot being so constructed and arranged that when said tubular members are twisted with respect to each other in either direction for permitting separation of the tubular members the detent is displaced and released from the slot, and a resilient air sealing closure sleeve covering said recess slot and making a circumferential closure on each of the tubular members when they are connected together.

2. A sealed tubular coupling for suction tubes including two tubular members arranged for separable telescoping jointure with each other to provide an air passageway from the one into the other, one of the tubular members having a spring pressed detent operatively mounted thereon, the other tubular member having a detent receiving recess formed in its tube wall and extending circumferentially around a substantial portion thereof for permitting substantial relative rotation between the tubular members with said detent received in said recess, the ends of said recess having sloping surfaces for automatically displacing and releasing said detent from the recess when the tubular members are twisted with respect to each other in either direction a required amount, and a resilient air sealing closure sleeve covering said recess and making a circumferential closure on each of the tubular members when they are connected together.

3. A sealed tubular coupling for suction tubes including two tubular members arranged for separable telescoping jointure with each other to provide an air passageway from the one into the other, one of the tubular members having a spring pressed detent operatively mounted thereon, the other tubular member having a detent receiving recess formed in its tube wall and extending circumferentially around a substantial portion thereof for permitting substantial relative rotation between the tubular members with said detent received in said recess, the detent and the ends of said recess being so constructed and arranged that when said tubular members are twisted with respect to each other in either direction for permitting separation of the tubular members the detent is displaced and released from the recess, said recessed tubular member having a flared end portion for automatically displacing said detent when said tubular members are being telescoped together, and a resilient air sealing closure sleeve covering said recess and making a circumferential closure on said recessed tubular member and extending beyond and inwardly of said flared end portion for making circumferential closure with the other tubular member.

EUGENE F. MARTINET.